(12) United States Patent
Heinrich et al.

(10) Patent No.: US 7,024,924 B2
(45) Date of Patent: Apr. 11, 2006

(54) METHOD AND ARRANGEMENT FOR DETERMINATION OF SHARPNESS OF CHOPPING BLADES

(75) Inventors: André Heinrich, Löbau (DE); Matthias Grimsel, Dresden (DE); Gerd Bernhardt, Bannewitz (DE)

(73) Assignee: Deere & Company, Moline, IL (US)

( * ) Notice: Subject to any disclaimer, the term of this patent is extended or adjusted under 35 U.S.C. 154(b) by 187 days.

(21) Appl. No.: 10/626,382

(22) Filed: Jul. 24, 2003

(65) Prior Publication Data

US 2004/0168528 A1    Sep. 2, 2004

(51) Int. Cl.
*G01N 19/08*    (2006.01)

(52) U.S. Cl. .............................................. 73/104

(58) Field of Classification Search ............... 73/104; 356/69
See application file for complete search history.

(56) References Cited

U.S. PATENT DOCUMENTS

| | | | | |
|---|---|---|---|---|
| 3,793,627 A | * | 2/1974 | Darrel et al. | 340/680 |
| 4,332,161 A | * | 6/1982 | Kakino | 73/104 |
| 4,831,365 A | * | 5/1989 | Thomas et al. | 340/680 |
| 5,407,265 A | * | 4/1995 | Hamidieh et al. | 340/680 |

FOREIGN PATENT DOCUMENTS

| | | |
|---|---|---|
| DE | 40 23 113 A | 6/1991 |
| DE | 199 03 153 C | 3/2000 |

* cited by examiner

*Primary Examiner*—Robert Raevis

(57) ABSTRACT

A method and arrangement for determination of the sharpness of chopping blades of a field chopper during chopping includes the steps of measuring, at least at two points in time, a characteristic parameter of the operating oscillation of a component of the chopping unit. Each such measurement obtains the oscillation fractions of at least two frequency bands of the measured signal or its peak, with the ratio between the two measurements being evaluated to generate a signal, when a certain deviation is determined between the initial measurement and the current measurement, which is indicative of the need to sharpen the chopping blades and the counterblade. The sharpening process can then be automatically initiated.

4 Claims, 4 Drawing Sheets

METHOD AND ARRANGEMENT FOR DETERMINATION OF SHARPNESS OF CHOPPING BLADES

FIELD OF THE INVENTION

The invention concerns a method and arrangement for determination of the sharpness of chopping blades, especially self-propelled field choppers and towed choppers during chopping.

BACKGROUND OF THE INVENTION

The cutting sharpness of chopping blades is decisive for the quality of the chopping material and the energy consumption of the chopper. The sharpness of blades is now determined primarily subjectively, above all by visual inspection of the chopping blades or by examining the quality of the chopping material. As in all visual evaluations, the experiences of the operating persons are essential.

The blades are poorly accessible. The chopper is stopped for inspection. The covers are removed. The blades are either immediately sharpened, as a result of evaluation, or only after subsequent inspections. Not only is the evaluation subjective, but the inspection point in time is also invariably subjective and therefore random, despite all experience. The inspections can only be conducted at larger time intervals because of the expense. The sharpening point in time cannot be optimally established in this procedure.

In many choppers, automatic sharpening and adjustment devices are now incorporated for the counterblades for immediate sharpening. With reliable determination of blade sharpness during chopping, the optimal point in time of sharpening could be determined more precisely and the downtime for sharpening reduced. Assembly work in the field and the risk of injury would be eliminated.

Some solutions for determination of blade sharpness of choppers during chopping are known. Generally, the power or moment of the chopper drive could be measured and the cutting forces determined from this. The moment, however, is not only dependent on blade sharpness, but also on throughput. This method is therefore too imprecise.

According to DE 199 03 153, the cutting forces acting on the counterblades are determined. It is assumed that the cutting forces necessarily rise during wear and a threshold value can therefore be established as a gauge for the now no longer sufficient blade sharpness. The cutting forces (the loads acting on the counterblades) are measured in two directions, namely, in the direction of the harvested product stream and also across this direction. At least two measurement devices are therefore always necessary, which must be aligned relatively precisely to each other and to the counterblade.

DE 40 23 113 and DE 40 23 114 start from the fact that the cutting geometry changes as a function of wear and, because of this, different stress pulses are induced in an inductive sensor during a pass. Limited blade thickness, and even more limited blade thickness through geometry changes with wear, impose strict limits on measurement accuracy.

The task of the invention is to offer a method and arrangement for determination of the sharpness of chopper blades with which the point in time for sharpening of the blades can be reliably determined during chopping.

SUMMARY OF THE INVENTION

According to the present invention, there is provided an improved method of determining the sharpness of the chopping blades of a forage chopper.

An object of the invention is to provide a method for determining the sharpness of the chopping blades of a forage chopper by measuring a sharpness characteristic parameter, more particularly the operational oscillation of the counterblade, at two points in time. This method is accomplished by steps wherein at least one characteristic parameter of the operational oscillation of the counterblade is determined by measurement at least two times. The first recording of the parameter occurs with a sharp cutting pair (chopping blade and counterblade). The parameter is then determined again at intervals, and the change in the parameter between the first and present determination is determined. When a certain amount of deviation between the values of the parameter during the first and current recording is surpassed, an event is initiated. The event can be the release of an optical and/or acoustic signal by a signal device provided for this purpose, which is either mounted in the driver's cabin of the chopper or is carried by the driver. The event can also be automatic initiation of the sharpening process during operation.

It was found that the change in state of sharpness of the chopping blade/counterblade pair leads to a change in oscillation behavior of both the chopping blade and the counterblade. Our own studies show that these changes can be recorded by measurement and evaluated for determination of the state of sharpness of the cutting pair. It was surprisingly found that specific oscillation parameters correlate with the state of sharpness.

In a simple variant, the method according to the invention can be conducted in the following steps:

1. recording and analysis of the characteristic parameter over one or more revolutions of the chopper drum at the beginning of the work process with a sharp cutting pair;
2. recording and analysis of the characteristic parameter at a point in time after the last measurement;
3. comparison of the analysis results of the first and current measurement,
4. surpassing of a chopper product-specific amount of deviation between the analysis results of the current and first measurement, continuation with (5), or otherwise with (2),
5. Initiation of an event.

Accelerations, forces, paths, elongations, acoustic pressure or other oscillation parameters, for example, of the counterblade, one or more chopper blades, the bearings of the blade shaft or other components of the chopper induced to mechanical oscillations by the cutting process, are preferably evaluated as characteristic parameters. They can be recorded axially, radially or tangentially to the blade drum or in any other spatial direction. Their analysis can occur in the time or frequency region.

The method, according to the invention, can be conducted by means of a compact arrangement that can be designed robustly, cheaply, and space-savingly as an additional device or as a component of the chopper. In an advantageous embodiment of the invention, the arrangement, according to the invention, has adaptive capabilities so that automation of sharpness determination is possible without demanding and time-consuming reference measurement and without manual intervention.

The arrangement, according to the invention, contains at least one sensor for measurement of mechanical quantities, a processing device suitable for recording and analysis of such measured values, and a signal transmitter for event display. Acceleration sensors, knock sensors or strain gauges can advantageously be used as sensors, along with a digital signal processor (DSP) or an onboard computer as a processing device, and a control light, an adder or an LCD display as a signal transmitter. The processing device advantageously has the capability of at least temporarily storing at least one discrete value. The sensors, processing device, and signal transmitter have means for data exchange or control. These means can be cables or transceivers for radio or infrared signals. The analysis and event release functions can advantageously be assumed by an onboard computer already present in the chopper.

BRIEF DESCRIPTION OF THE DRAWINGS

The invention is further explained below with reference to drawings.

DESCRIPTION OF THE PREFERRED EMBODIMENT

Figure 1:
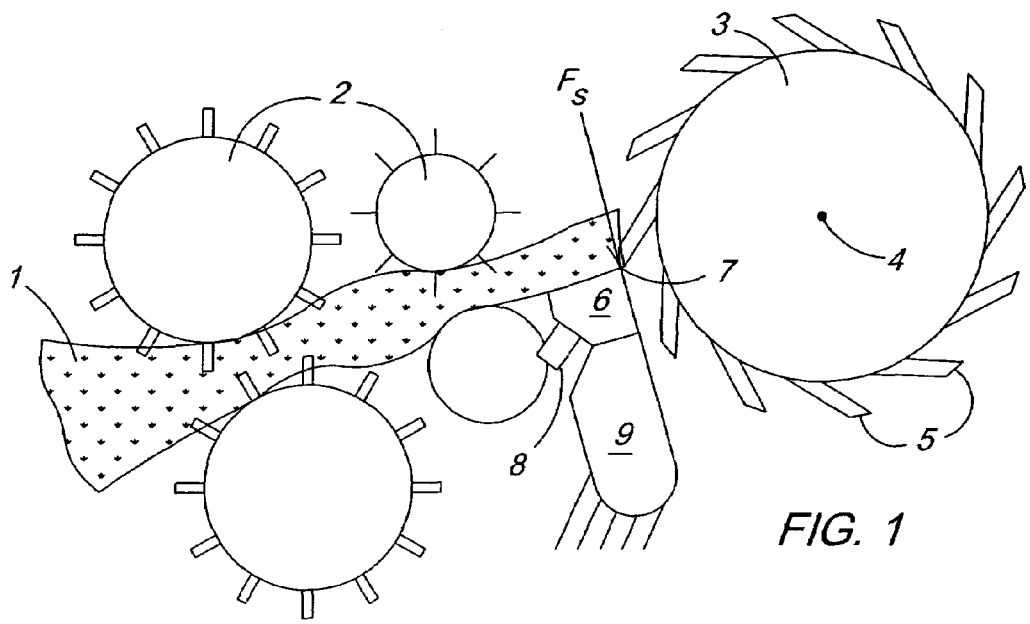
FIG. 1 is a schematic, left side elevational view showing a chopper feed roll, chopping blade, and counterblade arrangement together with a sensor.

Referring now to FIG. 1, there is shown a stream of material 1 to be chopped passing between top and bottom sets of crop compression rolls 2. The compression rolls 2 also act to feed the crop material 1 to a chopping drum 3 including a shaft 4 mounted for rotating about a transverse axis and carrying a plurality of chopping blades 5. The crop material 1 is fed across a counterblade 6 which cooperates with the chopping blades 5 to define a cutting gap 7 and to cut the crop material 1 into relatively short lengths as it passes across the gap 7. A sensor 8 is advantageously mounted to the counterblade 6 for providing a signal for measured value recording.

The blades 5 of the chopper drum 3 exert a cutting force $F_s$ on the crop material 1. The reaction force built up in the chopping material induces the blades 5, the chopping drum 3, and the bearings of its shaft 4 into oscillations.

The cutting force $F_s$ is transferred by the crop material 1 to the counterblade 6 and the counterblade support 9, so that the counterblade 6 and the counterblade support 9 are excited into oscillations.

Advantageously, a sensor 8 can be mounted at a protected location at the bottom or rear of the counterblade 6 or counterblade support 9 to measure a parameter of oscillation of the counterblade 6. The signals picked up by sensor 8 are sent by appropriate means, like cable or radio transmitter, to a processing device. The described arrangement of sensor 8 is particularly advantageous if an acceleration sensor is used.

It is also possible to measure the oscillations of blades 5 or the chopping drum 3. For the former variant, the use of strain gauges as sensors is advantageous, which are applied directly to the back side of one or more blades 5. The second variant can be advantageously accomplished by using force sensors that can be integrated, for example, in one of the bearings of shaft 4 of the chopper drum 3.

Figure 2:
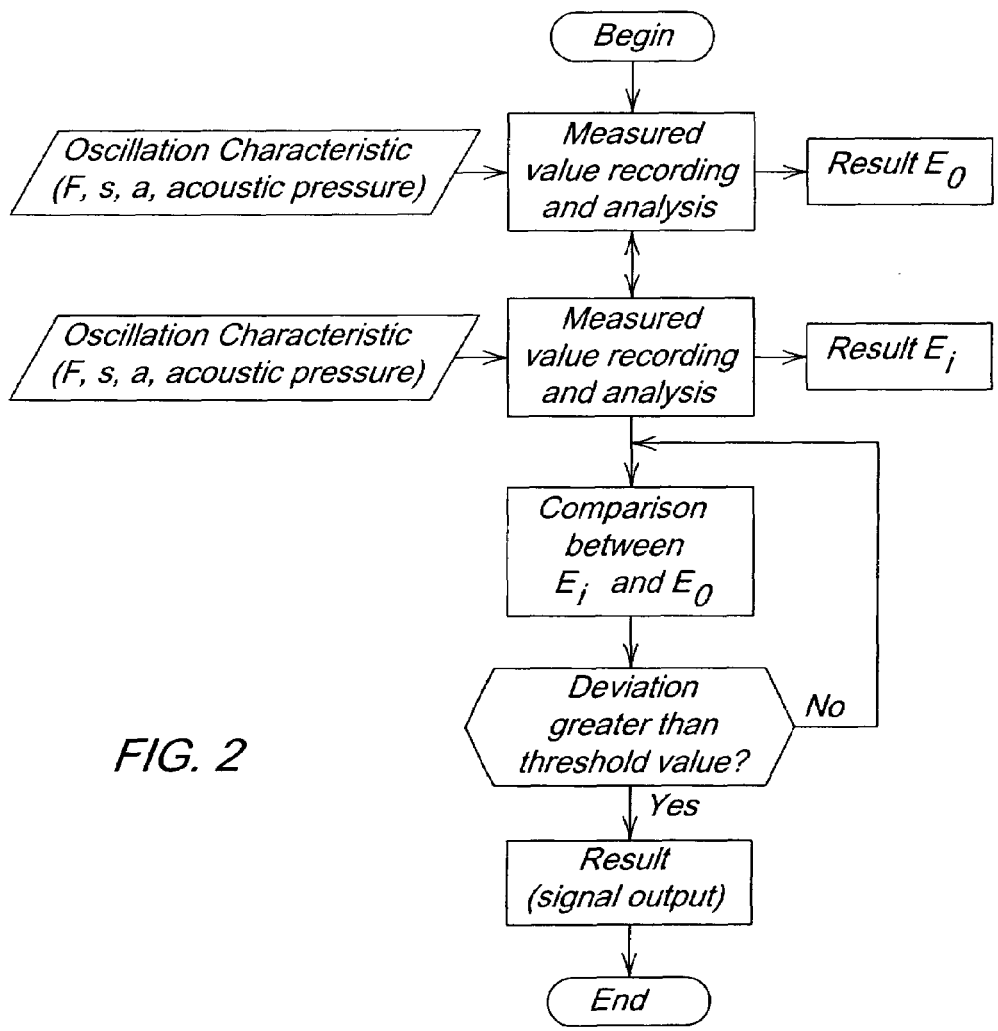
FIG. 2 is a flow chart depicting the method for measuring chopping blade sharpness according to the invention.

The method steps, according to the invention, are schematically depicted in FIG. 2. In a simple form, it includes the following steps.

At the beginning, a characteristic parameter of the oscillation, for example, acceleration, force, path, elongation or acoustic pressure, is recorded, analyzed and the result of analysis, for example, the time trend of one or more parameters of the characteristic parameters, is stored. During determination of parameters, only a very limited storage capacity is required.

Secondly, the characteristic parameter is recorded and analyzed again. Storage of the result of this analysis is not necessary, since it is further processed immediately in the next step.

Thirdly, the trends of the parameter or parameters of both measurements are compared.

Fourthly, when a threshold value of the deviation in trend of the parameter or parameters is surpassed, an event is initiated (fifth process step); otherwise a return to the second step occurs.

As an alternative, analysis of the measured data to obtain the parameter or parameters with both reportings can also be part of the third process step. In this case, a higher memory capacity is required, since the time trend of the characteristic parameter of both process steps must be temporarily stored.

Figure 3A:
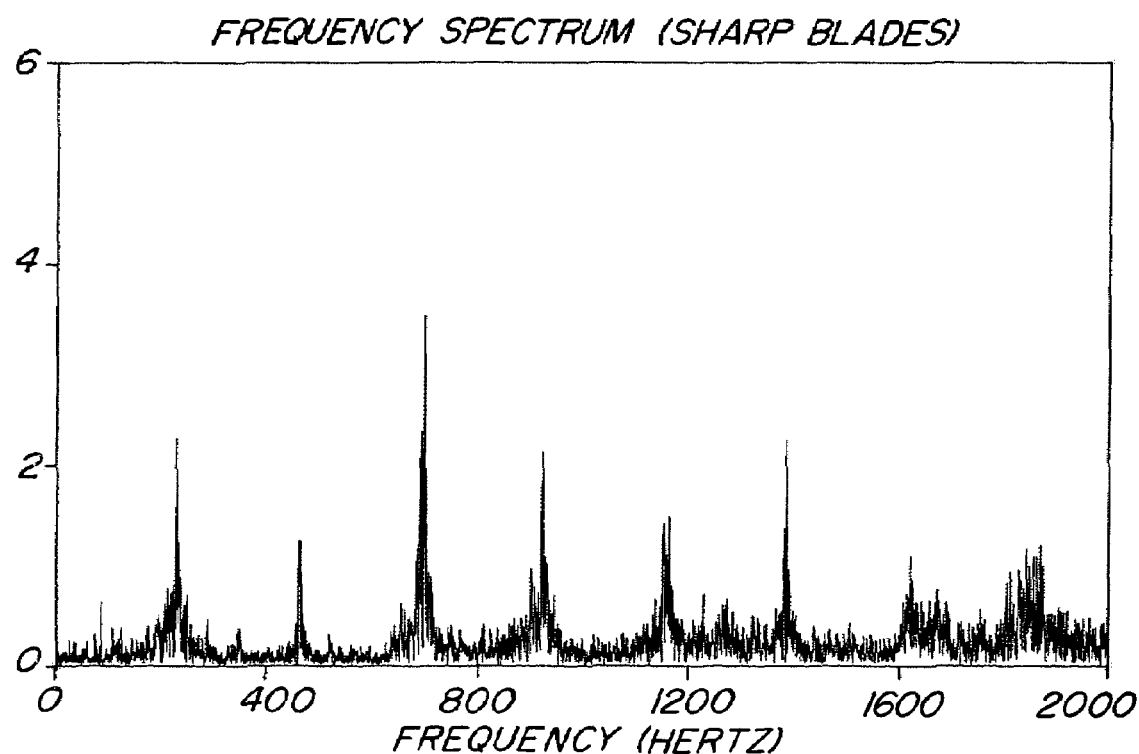
FIGS. 3a and 3b respectively show the frequency spectra of the characteristic parameter in sharp and dull blades.
Figure 3B:
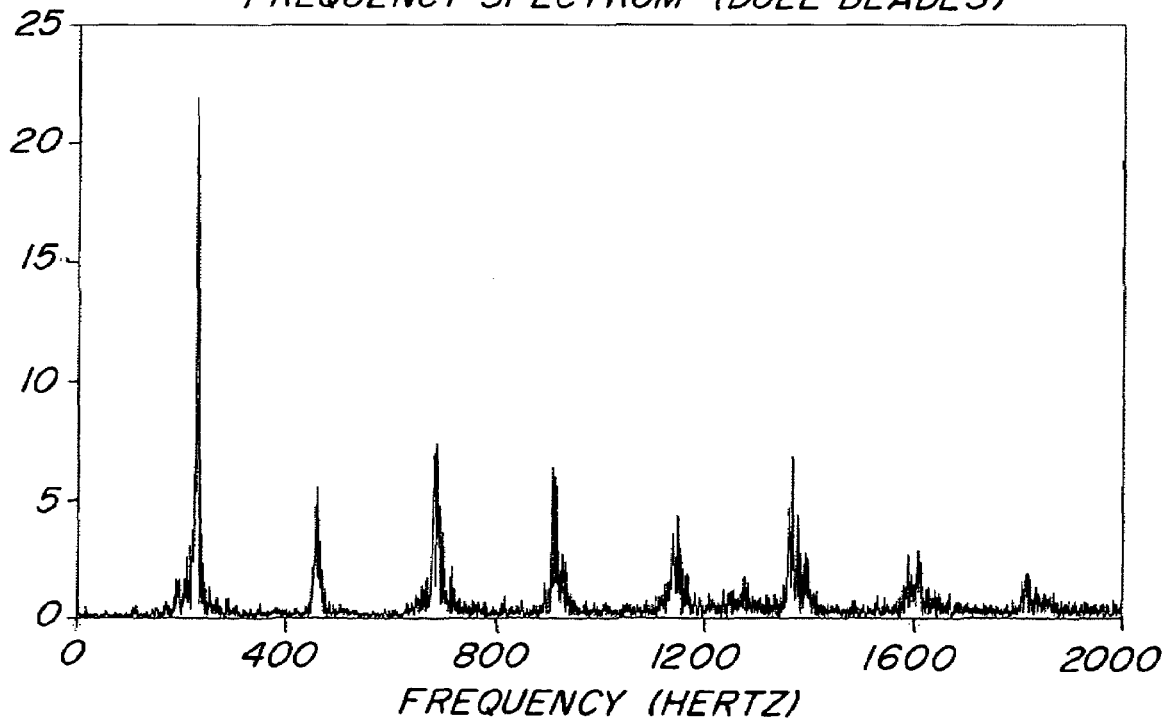

Analysis can occur in the time or frequency region. For example, the frequency region with two relevant frequency spectra of the characteristic parameter are respectively shown in FIGS. 3a and 3b. The diagram illustrated in FIG. 3a shows the spectrum generated with sharp blades 5, and FIG. 3b shows the spectrum generated with dull blades 5. Several peaks are readily apparent in both spectra at an interval of about 230 Hz. The peaks correspond to the response of the counterblade 6 and are harmonics. The qualitative ratio of base oscillation and harmonics changes with diminishing sharpness of the blades 5. Depending on throughput, quantitative changes can also occur from measurement to measurement. However, these have no effect on the ratio of the two peaks of a single measurement. For comparability of the spectra of two different measurements, however, normalization, as described below, is appropriate.

Figure 4A:
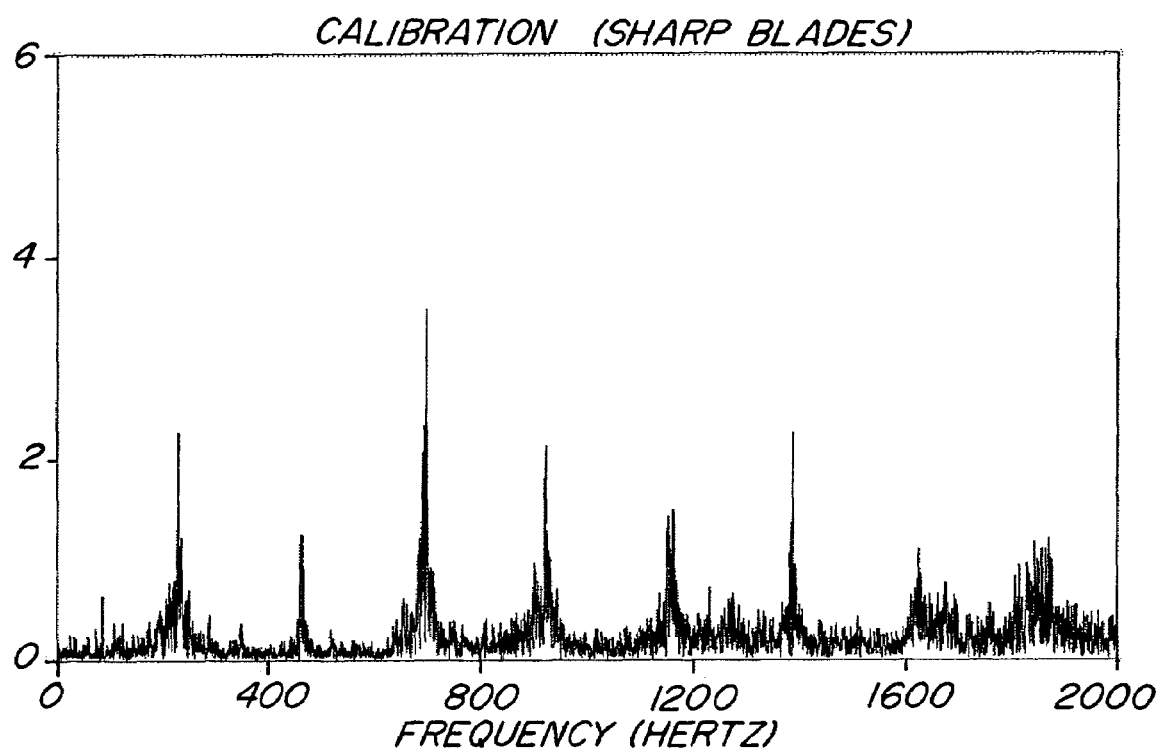
FIGS. 4a and 4b respectively show the frequency spectrum of the characteristic parameter in sharp blades and a weighting function.

The sensed signal can be calibrated as follows:

1. The frequency spectrum $S_0$ of the measured signal is determined in the range from 0–1 KHz from the measured signal $M_0$ in sharp blades. This is shown in FIG. 4a. The frequency spectrum is then normalized, so that:

$$\Sigma(S_{0i})=1.$$

Figure 4B:
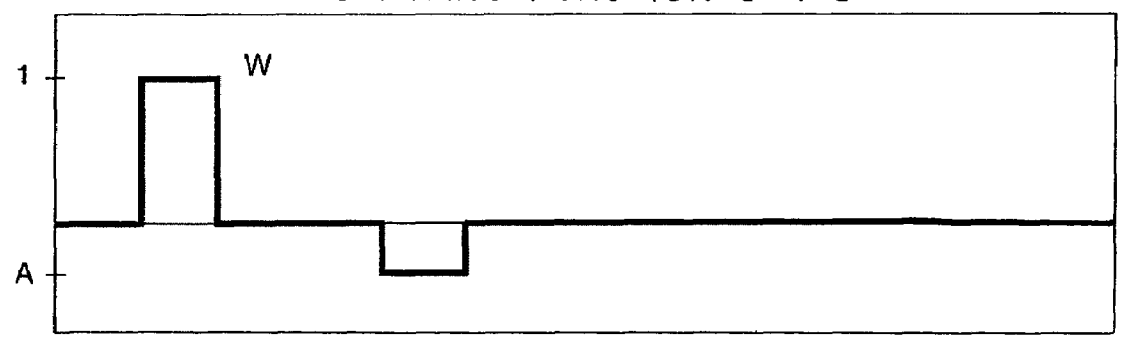

A weighting function (W) is then determined with:

$$W(f)=\{1 \text{ for } f_1^u \leq f \leq f_1^o;\ -A \text{ for } f_2^u \leq f \leq f_2^o;\ \text{otherwise } 0\},$$

in which the subscripts 1 and 2 denote the $1^{st}$ and $2^{nd}$ frequency band and the superscripts u and o the lower and upper limit of the corresponding band. One such weighting function W(f) is shown in FIG. 4b. With a proper choice of A, the following applies:

$$K_0=\Sigma(W^*S_{0i})=0;$$

The value of A can be determined either iteratively or according to the formula:

$$A=-\Sigma S_{0i}(f=f_1^u \ldots f_1^o)/\Sigma S_0(f=f_2^u \ldots f_2^o)$$

so that, with corresponding implementation in the processing device, an autonomous work method of the arrangement according to the invention can be implemented.

The evaluation of current cutting sharpness can be accomplished by:
1. After a stipulated interval, which can be stipulated by work hours or revolutions of the chopping drum 3, a new measured signal $M_1$ is recorded, whose spectrum $S_1$ is determined and also normalized, so that:

$$\Sigma(S_{1i})=1$$

$$K_1=\Sigma(W^*S_{1i})$$

$K_1$ is greater than zero and is an index of the actual blade sharpness. When a certain limit for $K_1$ is surpassed, for example, $K_1 > 1$, an event is initiated. The event can be the issuing of a signal or/and the initiation of a sharpening process. If the limit value is not surpassed, after an additional interval, another measured signal is recorded and further processed accordingly.

Figure 5A:
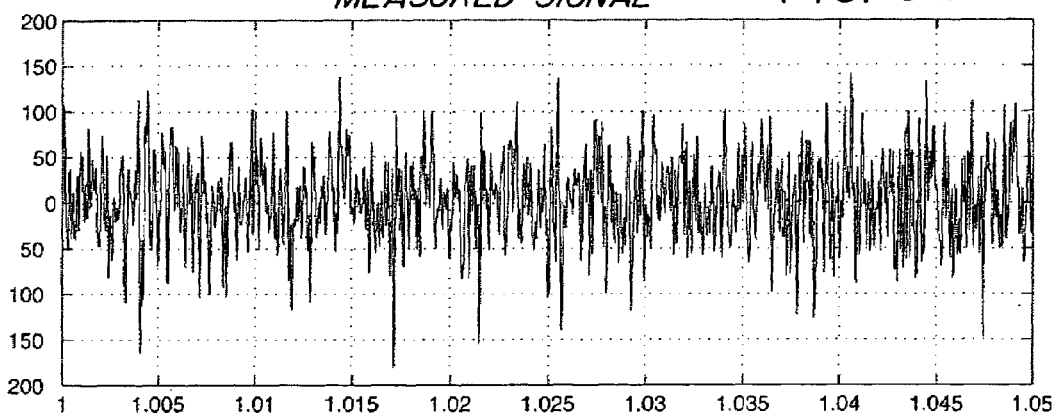
FIGS. 5a, 5b, and 5c respectively show the time signal of a characteristic parameter, as well as two results of filtering of this time signal with two different band pass filters.

In accordance with a second example, a time signal may be generated as the characteristic parameter. For example, the acceleration of the counterblade, is measured by a sensor over a certain period. This time signal is shown in FIG. 5a. The acceleration signal is then filtered by means of a band pass. The signal is filtered into at least two frequency bands. The frequency bands that are relevant for the sharpness information must be known beforehand. The position of the relevant frequency bands is machine and chopper product-dependent.

Figure 5B:
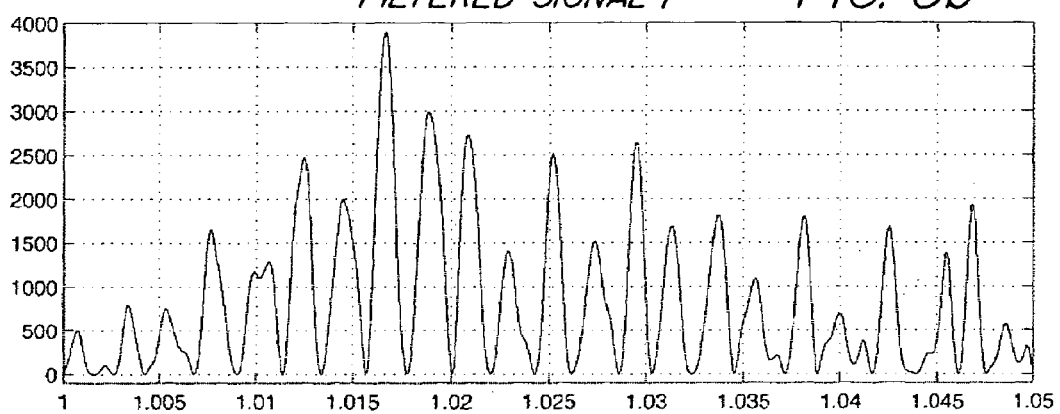
Figure 5C:
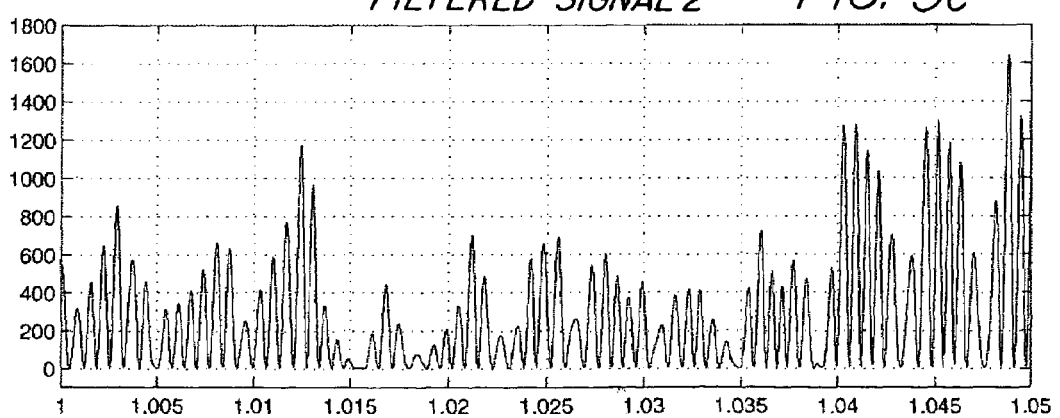

The results of filtering with two different band pass filters are respectively shown in FIGS. 5b and 5c. FIG. 5b is based on filtering with the limit frequencies $f_1{}^u=150$ Hz and $f_1{}^o=300$ Hz. A filter with $f_2{}^u=650$ Hz and $f_2{}^o=800$ Hz is used in FIG. 5c.

The two filtered signals are squared before integration in order to make the negative parts of the signal positive. As an alternative, the absolute value can also be formed. The obtained signals are then integrated over a defined period. Comparison of the integrals (at two frequency bands, for example, by division) gives the characteristic value K that changes significantly with sharpness of the blade.

In sharp blades, a characteristic value $K_0$ is formed. During operation, the present value $K_1$ is formed and compared with $K_0$. When a threshold value is surpassed, a signal and/or sharpening are triggered.

In accordance with another example, the sharpness sensing arrangement is used together with a PC. Specifically, the arrangement includes an acceleration sensor mounted on the counterblade 6 of a chopper. Its signal output is connected via a measurement amplifier to a personal computer (PC) with hardware for measured value evaluation and signal output, as well as software for measured value analysis and control of external devices. A control light is connected to an analog output of the PC, and is mounted in the driver's cabin of the chopper within visual range of the driver.

Before the beginning of chopping work with a sharp cutting pair (chopping knives 5 and counterblade 6), a reference measurement is made with the product to be processed. The trend of acceleration of the counterblade 6 is recorded over about 100 revolutions of the chopper drum 3. The measured acceleration signal is stored in the PC. It is then subjected to Fourier transformation. As an alternative, Fourier transformation can also occur online, so that no storage space for the time signal is required.

At least two regions (frequency bands) that have the highest peaks are determined in the frequency spectrum so obtained. The position of the relevant frequency bands is machine- and chopping material-dependent. The maximum values or integral values of the spectrum are then related to each other in the relevant frequency bands. This value is stored.

The use of adaptive band filters makes it possible to record only the relevant frequency bands in subsequent measurements, so that the computer performance and required storage space can be significantly reduced. The limit frequencies for the band filters can be adjusted specific to the chopping material by the machine manufacturer.

After a work cycle of about 10,000 to 50,000 revolutions of the chopping drum 3, the acceleration of the counterblade is measured again over several revolutions of the chopping drum, and then analyzed as in the first measurement. If the signal is subjected to Fourier transformation online, storage of the time signal can also be dispensed with here.

The new value of the ratio of the local maxima in each of the two relevant frequency bands is compared to the stored value of the first measurement. If the relative difference of both values is less than 15%, no event is triggered, but an additional cycle of about 10,000 to 50,000 revolutions of the chopping drum is carried out before another measurement is performed. If the deviation of the two values from each other is more than 15%, an electrical voltage is applied to the analog output of the PC. A control light, mounted in the driver's cabin of the chopper in the region of the dashboard, is connected to this output. The control light goes on. The driver sees the lit control light and stops the chopping process in order to activate the sharpening device. The analysis program is reset. The method can also be conducted from the outset after sharpening.

In a further embodiment, the sharpening arrangement can be used with an onboard computer. Specifically, the onboard computer of the chopper is programmed so that it can execute the step of analysis, the step of comparison, and the step of event triggering of the method according to the invention.

In this arrangement, a microphone is used for a sensor. Data exchange between the onboard computer and microphone occurs by radio. The microphone has a radio transmitter and the onboard computer has a radio receiver. A control light and an adder are integrated on the dashboard of the chopper and are responded to by the onboard computer via CAN-Bus if the criterion for resharpening of the chopper blade is reached.

The onboard computer has a switch for user input. The driver signals to the onboard computer the beginning of work by operating this switch. The onboard computer begins with measured value recording. One thousand revolutions of the chopping drum are analyzed online and the ratio of the two highest local maxima of the frequency spectrum are stored in the onboard computer.

Each subsequent block of 1000 revolutions, each without interruption, is then analyzed and the result compared with the stored value. If the actual value deviates by less than 15% from the stored value, it is discarded and the next block is analyzed. With a deviation of more than 15%, a signal is sent to the adder and the control light.

The adder then produces an acoustic signal and the control light an optical signal for the driver. If the driver acknowledges the signal by operating the switch provided for this on the onboard computer, the acoustic signal goes off. The optical signal persists until sharpening of the blade has been carried out.

In another variant, the onboard computer automatically executes the sharpening process during chopping. The activity of the sharpening device is indicated to the driver by an optical signal. After completion of sharpening, the optical signal goes off.

Having described the preferred embodiment, it will become apparent that various modifications can be made without departing from the scope of the invention as defined in the accompanying claims.

The invention claimed is:

1. A forage harvester with a chopping drum rotating about an axis and carrying a plurality of chopping blades, the forage harvester having means for feeding crop material across a counterblade mounted on a counterblade support and cooperating with the chopping blades to define a cutting gap and to cut the crop material into relatively short lengths as it passes across the gap, a sensor mounted at a protected location on one of the bottom of the counterblade and the rear of the counterblade and the counterblade support, the sensor operable to measure a parameter of oscillation of the counterblade, the sensor connected to a processing device which is operable to perform the steps of:
   a. making at least two measurements of the parameter of oscillation induced in said counterblade;
   b. comparing integrals of said parameter of oscillation at least two frequency bands of the measured signal or its maximum value for each of said two measurements, and;
   c. evaluating a change between said two measurements.

2. A forage harvester, as defined in claim 1, wherein:
   a. a first of said at least two measurements is made when said chopping blades are sharp and is followed by an analysis of at least two frequency regions of the measured signal;
   b. a second of said at least two measurements is made after a pre-selected interval determined by one of duration or revolutions of the chopping drum, that is greater than zero, and measurement analysis of the same frequency regions as are in step (2a) of said measurement signal;
   c. determining a reference value from analysis of said results of steps (2a) and (2b) by one of, forming a difference or a quotient, or by using a weighting function on the second measurement, recovered from the first measurement;
   d. comparing said reference value determined in step (2c) with a selectable threshold value of deviation, with a return to step (2b) when this threshold value of deviation is fallen short of; and
   e. triggering an event responsive to the comparison made in step (2d) when the threshold value of deviation is equaled or exceeded.

3. A forage harvester as defined in claim 1 wherein an analysis of said parameter of oscillation according to steps 1a through 1c occurs in the time or frequency region.

4. A forage harvester as defined in claim 1 wherein said parameter of oscillation is an acceleration, an elongation or an acoustic pressure.

* * * * *